US012682763B2

(12) United States Patent
Sundararaj et al.

(10) Patent No.: US 12,682,763 B2
(45) Date of Patent: Jul. 14, 2026

(54) DATALINK MESSAGE TRANSFORMER APPARATUS

(71) Applicant: ARINC Incorporated, Annapolis, MD (US)

(72) Inventors: Laveen Sundararaj, Hyderabad (IN); Bharat Kumar Chittanuru, Hyderabad (IN); Mohammed Musthafa Karuparamban, Bangalore (IN)

(73) Assignee: ARINC Incorporated, Annapolis, MD (US)

( * ) Notice: Subject to any disclaimer, the term of this patent is extended or adjusted under 35 U.S.C. 154(b) by 149 days.

(21) Appl. No.: 18/645,790

(22) Filed: Apr. 25, 2024

(65) Prior Publication Data

US 2025/0259548 A1 Aug. 14, 2025

(30) Foreign Application Priority Data

Feb. 9, 2024 (IN) .............................. 202441008811

(51) Int. Cl.
| | |
|---|---|
| *G08G 5/20* | (2025.01) |
| *G06F 9/54* | (2006.01) |
| *G08G 5/21* | (2025.01) |
| *H04L 51/066* | (2022.01) |

(52) U.S. Cl.
CPC .............. *G08G 5/20* (2025.01); *G06F 9/547* (2013.01); *G08G 5/21* (2025.01); *H04L 51/066* (2013.01)

(58) Field of Classification Search
CPC ... G08G 5/20; G08G 5/21; G08G 5/26; G06F 9/547; H04L 51/066
See application file for complete search history.

(56) References Cited

U.S. PATENT DOCUMENTS

| | | | |
|---|---|---|---|
| 5,629,691 A | 5/1997 | Jain | |
| 6,305,484 B1 | 10/2001 | Leblanc | |
| 7,343,229 B1 | 3/2008 | Wilson | |
| 7,974,773 B1 | 7/2011 | Krenz et al. | |
| 8,024,078 B2 | 9/2011 | Coulmeau et al. | |
| 8,046,165 B2 | 10/2011 | Sacle et al. | |
| 8,560,214 B1 | 10/2013 | Krenz et al. | |
| 8,620,493 B2 | 12/2013 | Hughes et al. | |
| 8,660,783 B2 | 2/2014 | Marczi et al. | |
| 8,718,911 B2 | 5/2014 | McGuffin | |

(Continued)

FOREIGN PATENT DOCUMENTS

| | | |
|---|---|---|
| EP | 4252222 A1 | 10/2023 |

OTHER PUBLICATIONS

"Libacars" by Tomasz Lemiech, downloaded from The Wayback Machine Mar. 9, 2021 (Year: 2021).*

(Continued)

*Primary Examiner* — Kito R Robinson
*Assistant Examiner* — Tanya C Sienko
(74) *Attorney, Agent, or Firm* — Suiter Swantz IP

(57) ABSTRACT

A datalink message transformer apparatus may convert a text-based datalink message into graphical, application, browser, and actuator commands for enhanced safety, autonomy, and trajectory-based operations enablement on ground side. An aircraft may include one or more processors which execute the datalink message transformer apparatus. The text-based datalink message may be Controller-Pilot Data Link Communication (CPDLC) messages.

19 Claims, 8 Drawing Sheets

310

(56) References Cited

U.S. PATENT DOCUMENTS

| | | | |
|---|---|---|---|
| 8,965,671 | B2 | 2/2015 | Choksi et al. |
| 9,092,976 | B2 | 7/2015 | Khatwa et al. |
| 9,202,380 | B1 | 12/2015 | Shapiro et al. |
| 9,222,800 | B1 | 12/2015 | Scherer et al. |
| 9,443,438 | B1 | 9/2016 | Shapiro et al. |
| 9,666,081 | B2 | 5/2017 | Gomez et al. |
| 9,812,019 | B2* | 11/2017 | McGuffin ........... H04B 7/18506 |
| 9,836,661 | B2 | 12/2017 | Zhou et al. |
| 10,127,821 | B2 | 11/2018 | Balasubramanian et al. |
| 10,234,303 | B1 | 3/2019 | Chandrashekarappa et al. |
| 10,290,217 | B1 | 5/2019 | Ramachandra et al. |
| 10,297,159 | B2 | 5/2019 | Srivastav et al. |
| 10,446,039 | B2 | 10/2019 | Shamasundar et al. |
| 10,621,874 | B2 | 4/2020 | Vieten |
| 10,789,854 | B1 | 9/2020 | Kolesinski |
| 10,902,732 | B2 | 1/2021 | Srinivasan et al. |
| 11,001,398 | B1 | 5/2021 | Salyer |
| 11,094,211 | B2 | 8/2021 | Turcios et al. |
| 11,164,466 | B2 | 11/2021 | Bazawada et al. |
| 11,307,596 | B2 | 4/2022 | Mackin et al. |
| 11,315,434 | B2 | 4/2022 | Kolesinski et al. |
| 11,475,779 | B2 | 10/2022 | Erignac |
| 11,667,400 | B2 | 6/2023 | Rosenberg |
| 11,670,183 | B2 | 6/2023 | Baladhandapani et al. |
| 11,688,291 | B2 | 6/2023 | Wang et al. |
| 11,698,637 | B2* | 7/2023 | Arima .............. G08G 1/096725 701/25 |
| 11,749,127 | B2 | 9/2023 | Khatwa et al. |
| 2003/0135327 | A1 | 7/2003 | Levine et al. |
| 2005/0192738 | A1 | 9/2005 | Conner et al. |
| 2005/0283305 | A1 | 12/2005 | Clark et al. |
| 2007/0043483 | A1 | 2/2007 | Bagge et al. |
| 2010/0292912 | A1 | 11/2010 | Palanichamy et al. |
| 2012/0253649 | A1* | 10/2012 | McGuffin ................. G08G 5/51 701/120 |
| 2014/0303815 | A1 | 10/2014 | Lafon et al. |
| 2016/0293014 | A1* | 10/2016 | Gomez .............. H04B 7/18506 |
| 2016/0379499 | A1 | 12/2016 | Balasubramanian et al. |
| 2018/0061243 | A1 | 3/2018 | Shloosh |
| 2018/0181125 | A1 | 6/2018 | Ceccom |
| 2018/0268718 | A1* | 9/2018 | Srivastav ................. G08G 5/26 |
| 2020/0302809 | A1 | 9/2020 | Turcios et al. |
| 2021/0233412 | A1* | 7/2021 | Bazawada ................. G08G 5/53 |
| 2021/0358316 | A1 | 11/2021 | Kolesinski et al. |
| 2021/0362878 | A1 | 11/2021 | Vana |
| 2022/0051578 | A1 | 2/2022 | Kolesinski et al. |
| 2022/0307853 | A1 | 9/2022 | Davis et al. |
| 2022/0309935 | A1 | 9/2022 | Davis et al. |
| 2022/0383756 | A1 | 12/2022 | Krenz et al. |
| 2022/0406194 | A1 | 12/2022 | Saptharishi et al. |
| 2023/0093956 | A1 | 3/2023 | S et al. |
| 2023/0123419 | A1 | 4/2023 | He et al. |
| 2023/0135561 | A1 | 5/2023 | Stone et al. |
| 2023/0136572 | A1 | 5/2023 | Songa et al. |
| 2023/0230490 | A1 | 7/2023 | Lalisse-Bauvin et al. |

OTHER PUBLICATIONS

YouTube video, "Controller-pilot data link communications (CPDLC)" Dec. 15, 2018 https://youtu.be/uC2_zbJ4qcc?si=mG06Nsibg1-7_OmR (Year: 2018).*

U.S. Department of Transportation. Advisory Circular No. 90-117. Oct. 3, 2017. Available at: https://www.faa.gov/documentlibrary/media/advisory_circular/ac_90-117.pdf.

Zarrin Chua et al. Simulating Air Traffic Control Ground Operations: Preliminary Results from Project Modern Taxiing. Published Nov. 26, 2014. Available At: https://www.sesarju.eu/sites/default/files/documents/SID/2014/SID%202014-49%20slides.pdf.

European Search Report received in EP Application No. 25156697.2, May 30, 2025, 10 pages.

* cited by examiner

100

210

302

304

210

DATALINK MESSAGE TRANSFORMER APPARATUS

CROSS-REFERENCE TO RELATED APPLICATIONS

The present application claims the benefit of India Provisional Patent Application 20/244,1008811, filed Feb. 9, 2024, titled "Datalink Message Transformer Apparatus", with a DAS code of E3E3, which is incorporated herein by reference in the entirety.

TECHNICAL FIELD

The present invention generally relates to traffic control systems for aircraft, and more specifically for traffic control when on the ground.

BACKGROUND

Coordination of aircraft movement on ground is a vital activity for safe and efficient operation of airports. There is a heavy reliance on voice and data communication between air traffic controllers and pilots. Errors in communication, judgement or situational awareness may prove costly. Aircraft ground movements and taxi procedures are performed by Pilot based on voice/text instructions enabled by Aeronautical Telecommunication Network-Baseline 2 (ATN B2) standards. Pilot must rely on voice/text instructions. Non-English-speaking Pilots or those who are not fluent in English must deal with understanding the instructions. Pilots who are not familiar with an airport have to deal with identifying the taxiway markers and corelate the instructions. This increases Pilot workload and leaves room for error during ground navigation operations. Therefore, it would be advantageous to provide a device, system, and method that cures the shortcomings described above.

SUMMARY

In some aspects, the techniques described herein relate to an aircraft including: a communication system configured to transmit and receive a plurality of Controller Pilot Data Link Communications (CPDLC) messages; wherein the communication system is configured to execute a CPDLC application; a memory maintaining program instructions; and one or more processors configured to execute the program instructions causing the one or more processors to execute: a datalink message transformer apparatus (DMTA); wherein the datalink message transformer apparatus includes a message queue, a message sequence look-up table, a sequence identifier, an identified sequence, and an action generator; wherein the datalink message transformer apparatus is configured to receive the plurality of CPDLC messages from the CPDLC application and store the plurality of CPDLC messages in the message queue; wherein the sequence identifier is configured to look-up the plurality of CPDLC messages which are stored in the message queue in the message sequence look-up table to identify the identified sequence; wherein the action generator is configured to generate at least one of a graphical information, an application information, or an actuation command from the identified sequence.

In some aspects, the techniques described herein relate to an aircraft, wherein the plurality of CPDLC messages include at least one of a plurality of CPDLC departure clearance messages or a plurality of Data Link Taxi messages.

In some aspects, the techniques described herein relate to an aircraft, wherein the sequence identifier is configured to identify a beginning and an end of the identified sequence based on a start of transaction and an end of transaction of the plurality of CPDLC messages.

In some aspects, the techniques described herein relate to an aircraft, wherein the CPDLC application is configured to decode the plurality of CPDLC messages.

In some aspects, the techniques described herein relate to an aircraft, wherein the CPDLC application is configured to decode the plurality of CPDLC messages from an Abstract Syntax Notation One (ASN.1) format.

In some aspects, the techniques described herein relate to an aircraft, wherein the CPDLC application is configured to communicate the plurality of CPDLC messages to the datalink message transformer apparatus using one or more inter-process communication methods.

In some aspects, the techniques described herein relate to an aircraft, wherein the sequence identifier is configured to identify the identified sequence by matching the identified sequence with a predefined sequence in the message sequence look-up table.

In some aspects, the techniques described herein relate to an aircraft, wherein the predefined sequence includes a pushback request and response sequence.

In some aspects, the techniques described herein relate to an aircraft, wherein the pushback request and response sequence includes a request pushback downlink message, a pushback approved uplink message, an expect pushback uplink message, and a will-comply response.

In some aspects, the techniques described herein relate to an aircraft, including a flight display, wherein the flight display is configured to display an airport moving map; wherein the action generator is configured to generate the graphical information from the identified sequence; the program instructions causing the one or more processors to execute an airport moving map overlay; wherein the airport moving map overlay is configured to cause the flight display to overlay the graphical information on the airport moving map.

In some aspects, the techniques described herein relate to an aircraft, including an electronic flight bag; the program instructions causing the one or more processors to execute an application interface; wherein the action generator is configured to generate the application information from the identified sequence; wherein the electronic flight bag is configured to receive the application information via the application interface and display the application information.

In some aspects, the techniques described herein relate to an aircraft, wherein the application interface is an application programming interface.

In some aspects, the techniques described herein relate to an aircraft, including an actuator; wherein the action generator is configured to generate the actuation command from the identified sequence; the program instructions causing the one or more processors to execute an actuation manager; wherein the actuation manager is configured to cause the actuator to locomote the aircraft based on the actuation command.

In some aspects, the techniques described herein relate to an aircraft, wherein the action generator is configured to determine a "from location" and a "to location" from the identified sequence; wherein the action generator is configured to determine a plurality of vertices and a plurality of vectors between the "from location" and the "to location"; wherein at least one of the graphical information, the application information, or the actuation command includes the "from location", the "to location", the plurality of vertices, and the plurality of vectors.

In some aspects, the techniques described herein relate to a system including: an aircraft including: a communication system configured to transmit and receive a plurality of CPDLC messages; wherein the communication system is configured to execute a CPDLC application; a memory maintaining program instructions; and one or more processors configured to execute the program instructions causing the one or more processors to execute: a datalink message transformer apparatus; wherein the datalink message transformer apparatus includes a message queue, a message sequence look-up table, a sequence identifier, an identified sequence, and an action generator; wherein the datalink message transformer apparatus is configured to receive the plurality of CPDLC messages from the CPDLC application and store the plurality of CPDLC messages in the message queue; wherein the sequence identifier is configured to look-up the plurality of CPDLC messages which are stored in the message queue in the message sequence look-up table to identify the identified sequence; wherein the action generator is configured to generate at least one of a graphical information, an application information, or an actuation command from the identified sequence; and an air traffic service unit; wherein the communication system is configured to transmit and receive the plurality of CPDLC messages with the air traffic service unit.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF THE INVENTION

Figure 1A:
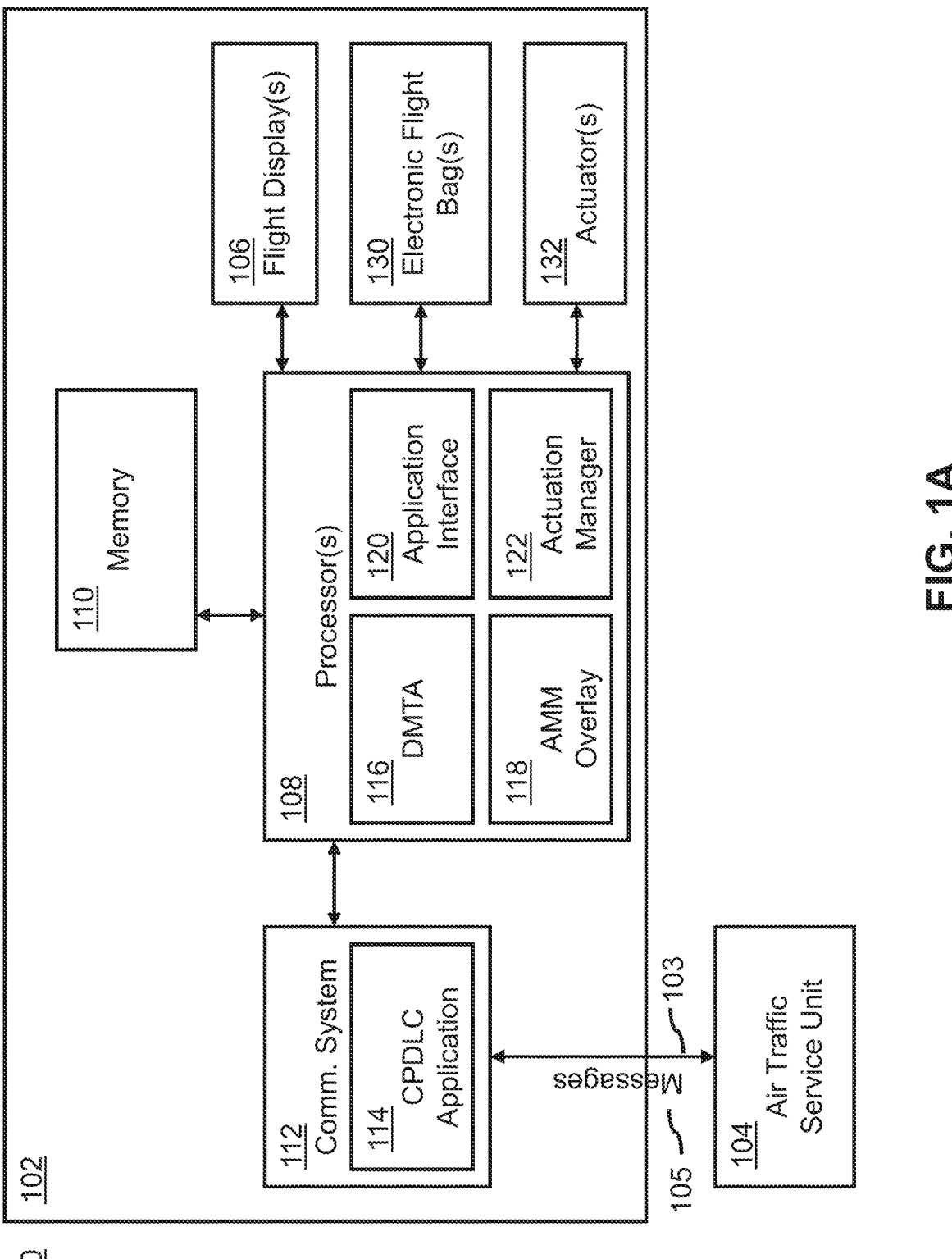
FIGS. 1A-1B depicts a block diagram of a system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring generally now to one or more embodiments of the present disclosure. Embodiments of the present disclosure are directed to a datalink message transformer apparatus. The datalink message transformer apparatus may convert a text-based datalink message into graphical, application, browser, and actuator commands for enhanced safety, autonomy, and trajectory-based operations enablement on ground side. An aircraft may include one or more processors which execute the datalink message transformer apparatus. The text-based datalink message may be Controller-Pilot Data Link Communication (CPDLC) messages.

U.S. Patent Publication Number US20070043483A1, titled "Runway incursion detection system and method for displaying a runway incursion"; U.S. Pat. No. 8,620,493B2, titled "Electric taxi auto-guidance and control system"; U.S. Patent Publication Number US20050283305A1, titled "Method and system for entering and displaying ground taxi instructions"; U.S. Patent Publication Number US20220307853A1, titled "System and method to display airport moving map and taxi routing guidance content"; U.S. Pat. No. 10,789,854B1, titled "Graphical depiction of an exclusion zone on an airport movement surface"; U.S. Pat. No. 9,202,380B1, titled "System and method for electronically recording a taxi clearance on an aircraft display unit"; U.S. Patent Publication Number US20160379499A1, titled "Aircraft systems and methods to improve airport traffic management"; U.S. Patent Publication Number US20180061243A1, titled "System and methods for automated airport air traffic control services"; U.S. Patent Publication Number US20120253649A1, titled "Systems and methods for presenting taxi instructions and reducing runway incursions"; U.S. Pat. No. 10,297,159B2, titled "Systems and methods for graphical visualization of communication transmissions received onboard an aircraft"; U.S. Pat. No. 8,965,671 B2, titled "Aircraft taxiing system"; U.S. Pat. No. 11,688,291B2, titled "Cockpit display systems and methods for displaying taxiing route on airport moving map"; U.S. Pat. No. 9,666,081B2, titled "Method and electronic device for managing, in the form of sequences, messages exchanged between an aircraft and a ground station, related computer program product"; are each incorporated herein by reference in the entirety.

Figure 1B:
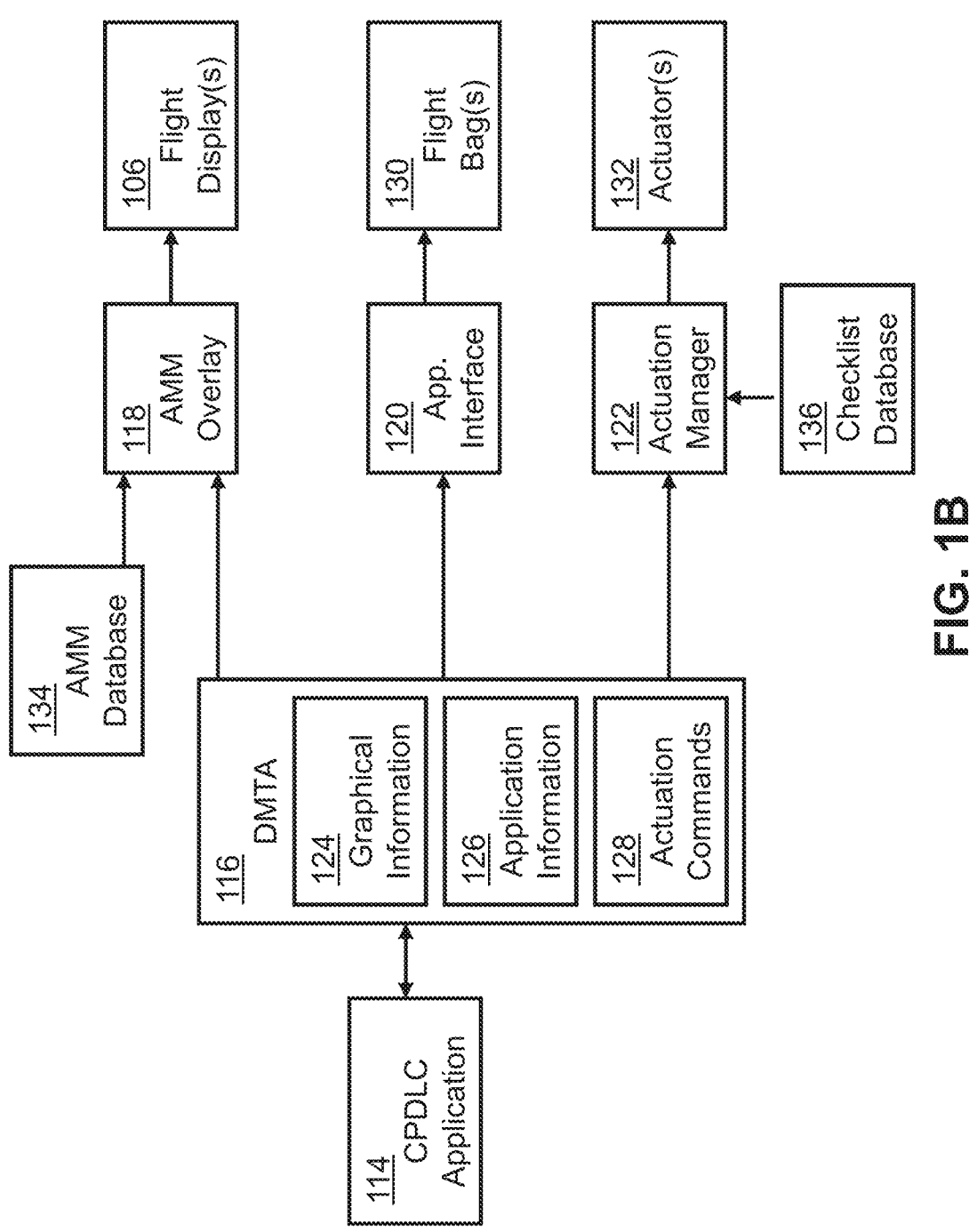
Figure 1C:
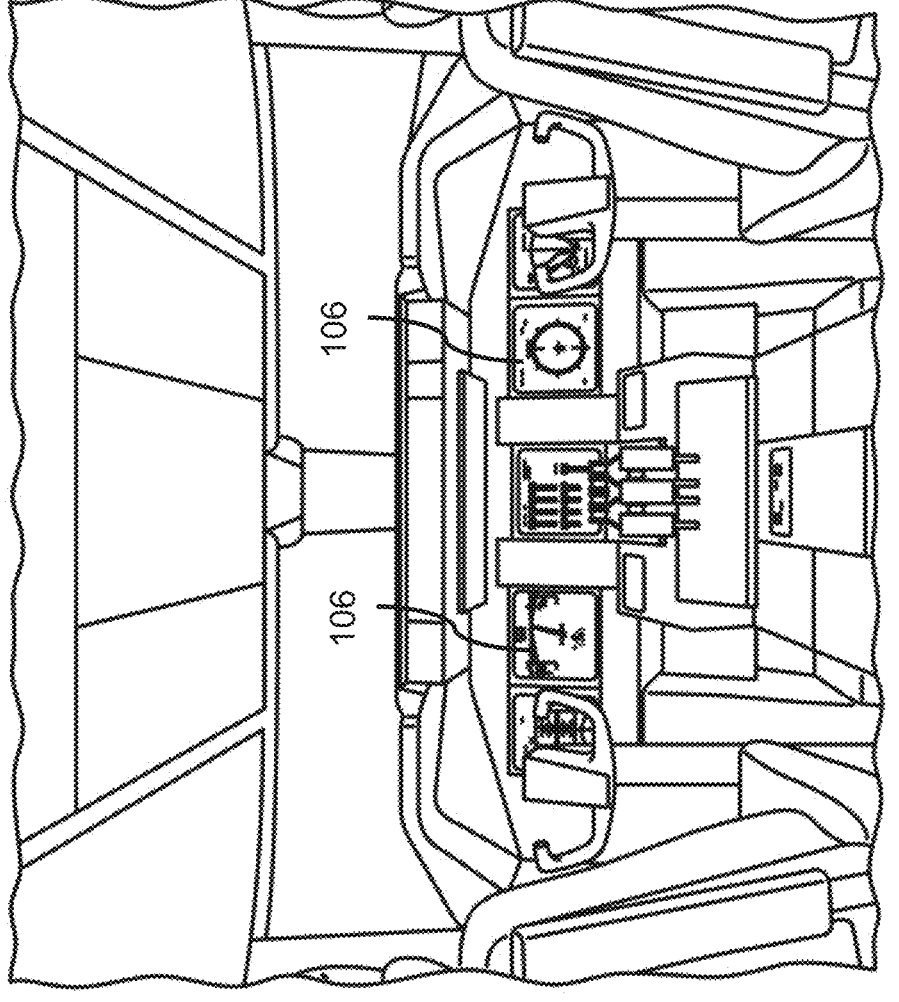
FIG. 1C depicts a perspective view of flight displays of an aircraft, in accordance with one or more embodiments of the present disclosure.

Referring to FIGS. 1A-1C, a system 100 is described, according to one or more embodiments of the present disclosure. The system 100 may include one or more components, such as, but not limited to, an aircraft 102, an air traffic service unit 104, and the like. The aircraft 102 may include flight displays 106, processors 108, memory 110, communication system 112, electronic flight bags 130, actuators 132, and the like.

The air traffic service unit 104 may include one or more processors, memory configured to store one or more programs instructions and/or one or more databases, and/or one or more communication interfaces.

The aircraft 102 may include the communication system 112. The communication system 112 may also be referred to as an aircraft data link communication system. The communication system 112 may be configured to communicate via an Aeronautical Telecommunications Networks (ATN), such as, but not limited to, ATN Baseline 1 (ATN B1) and/or ATN Baseline 2 (ATN B2). ATN may be an inter-network architecture permitting ground, air-ground, and avionics data subnetworks to exchange digital data.

The communication system 112 may be configured to communicate with the air traffic service unit 104. The aircraft 102 and the air traffic service unit 104 may communicate via a data link 103. For example, the communication system 112 of the aircraft 102 and the air traffic service unit 104 may communicate via the data link 103. The data link 103 may include, but is not limited to, a very-high frequency (VHF) data link (VDL), a high-frequency (HF) data link, a satellite communication (SATCOM) data link, and the like. The VHF data link may be considered a line-of-sight link. The HF data link may be considered a beyond-line of sight link which may reflect from the ionosphere. The data link 103 may directly communicate with the aircraft 102 when the aircraft 102 is on ground. The communication may include transmitting and receiving messages.

Controller-Pilot Data Link Communication (CPDLC) may refer a two-way datalink communication between the aircraft 102 and the air traffic service unit 104. The aircraft 102 and the air traffic service unit 104 may communicate CPDLC messages 105 via the data link 103. The communication system 112 may be configured to transmit and receive the CPDLC messages 105. For example, the communication system 112 may be configured to transmit and receive the CPDLC messages 105 with the air traffic service unit 104. The CPDLC messages 105 may include digital information. In this regard, the data link 103 may provide a means by which to transmit and receive digital information. The CPDLC messages 105 may include Downlink Messages (DM) and Uplink Message (UM). The air traffic service unit 104 may uplink the uplink messages via the data link 103 to the aircraft 102. The aircraft 102 may downlink the downlink messages via the data link 103 to the air traffic service unit 104. The CPDLC messages 105 may include one or more clearances from the air traffic service unit 104 to proceed from/to a gate/stand to/from the runway or between any two points on the airport surface. For example, the CPDLC messages 105 may provide clearance for the aircraft 102 from pushback to takeoff and/or from landing to arrival. In this regard, the CPDLC messages 105 may include instructions to take the aircraft 102 from a gate to a taxiway and/or from the taxiway to the gate.

The CPDLC messages 105 may follow a standard format and/or may be free text. The downlink messages from the aircraft 102 to the air traffic service unit 104 may follow the standard format and/or may be free text. The uplink messages from the air traffic service unit 104 to the aircraft 102 may follow the standard format. The standard format may include, but is not limited to, Controller Pilot Data Link Communication (CPDLC) Uplink and Downlink Tables. In embodiments, the CPDLC messages 105 may include CPDLC departure clearance messages (CPDLC DCL messages), Data Link Taxi messages (D-Taxi messages), and the like. The CPDLC messages 105 may include one or more clearances to proceed from/to a gate, stand to/from the runway, or proceed between any two points on the airport surface. The CPDLC messages 105 may include requesting and delivering initial and revised departure clearances. The CPDLC messages 105 may include departure procedure, flight plan route, initial and requested altitude, beacon code, departure frequency, and other non-route information.

The communication system 112 may be configured to execute a CPDLC application 114. The CPDLC application 114 may receive one or more of the CPDLC messages 105. The CPDLC application 114 may receive the CPDLC messages 105 as one or more packets. The packets may be encoded according to one or more protocols. The CPDLC application 114 may decode the CPDLC messages 105 from the packets. In embodiments, the CPDLC application 114 may exchange the CPDLC messages 105 with the air traffic service unit 104 using the air-ground communication services (VHF/HF/SATCOM) in Abstract Syntax Notation (ASN.1) format. The CPDLC application 114 may be configured to decode the CPDLC messages 105 from the ASN.1 format. The CPDLC application 114 may receive and send the CPDLC messages 105 with the air traffic service unit 104 over text. With the introduction of new Baseline 2 Air Traffic Services (ATS) Data communication standard, there are certain of the CPDLC messages 105 to perform ground/surface movement operations. The CPDLC messages 105 may have a standard syntax (ASN.1) and have specified information (pushback, from/to points on airport surface, clearances, and the like). In embodiments, the CPDLC messages 105 may include Baseline 2 ATS data communication standards-based Departure Clearance (DCL) and/or Datalink Taxi (D-TAXI) messages.

The memory 110 may include an AMM database 134, a checklist database 136, a message queue 202 and the like.

The AMM database 134 may also be referred to as an airport surface database(s). The AMM database 134 may include airport surface data, which includes information of an airport surface. The AMM database 134 may include the Airport Surface Database (ASDB) and/or the Airport Surface Routing Network (ASRN). For example, the ASRN may be a data set containing "nodes" identifying the location and various other characteristics of navigable airport surface features (such as taxiway-taxiway intersections, runway-taxiway intersections, parking stands, etc.) and "edges" providing information how nodes are interconnected from a navigation standpoint. This information may be used to construct possible paths or routes from one location to another at a given airport. The AMM database 134 may include information about an airport movement surface (e.g., an exclusion zone around departure runways), information about a flight plan of the aircraft 102 (e.g., taxi route, flight plan progress, or the like), or the like. The AMM database 134 may contain records which provide runway data. The AMM database 134 may contain navigation reference data representative of information associated with, but not limited to, airport and airport surfaces including runways and taxiways. The AMM database 134 may be used to store airport data that may be comprised of, in part, airport surfaces and airport visual aids. Airport surfaces include, but are not limited to, locations and information delineating or defining locations of runways, taxiways, and apron areas, fixed based operators ("FBOs"), terminals, and other airport facilities. Airport visual aids include, but are not limited to, airport pavement markings, runway markings, taxiway markings, holding position markings, airport signs, mandatory instruction signs, location signs, direction signs, destination signs, information signs, and runway distance remaining signs. The AMM database 134 may include an aerodrome mapping database ("AMDB") as described in the following document published by RTCA, Incorporated: RTCA DO-272A entitled "User Requirements for Aerodrome Mapping Information." RTCA DO-272A provides for aerodrome surface mapping requirements for aeronautical uses particularly on-board aircraft.

The checklist database 136 may include required taxi phase checklist and other required pre taxi operations.

The processors 108 may be configured to execute a datalink message transformer apparatus 116, an airport moving map overlay 118, an application interface 120, an actuation manager 122, and the like.

The CPDLC application 114 may send the CPDLC messages 105 to the datalink message transformer apparatus 116. The datalink message transformer apparatus 116 may receive the CPDLC messages 105 from the CPDLC application 114. The datalink message transformer apparatus 116 and the CPDLC application 114 may communicate using one or more inter process communications. For example, the datalink message transformer apparatus 116 and the CPDLC application 114 may communicate using message queues, pipes, shared memory, and the like. The datalink message transformer apparatus 116 and the CPDLC application 114 may communicate using applicable industry standards, such as, but not limited to, ARINC A664 (AFDX part 7), ARINC 429, RS232, RS422, and the like. The CPDLC application 114 may transfer the CPDLC messages 105 using one or more inter-process communication methods (e.g. Shared Memory Object (SMO)) or other appropriate inter-process communication method that can non-intrusively transfer the CPDLC messages 105 from CPDLC application 114 to the datalink message transformer apparatus 116 without affecting the integrity of the CPDLC application 114.

The processors 108 may be configured to execute the datalink message transformer apparatus 116. The datalink message transformer apparatus 116 may convert the CPDLC messages 105 to one or more forms for intuitive human/machine consumption. The datalink message transformer apparatus 116 may convert the CPDLC messages 105 into graphical information 124, application information 126, and/or actuation commands 128. For example, the datalink message transformer apparatus 116 may convert CPDLC ATN B2 DCL and D-Taxi messages into graphical information 124, application information 126, and/or actuation commands 128. The datalink message transformer apparatus 116 may convert the CPDLC messages 105 by extracting data from the CPDLC messages 105, as will be described further herein. The graphical information 124, the application information 126, and/or the actuation commands 128 may be transmitted over a defined software protocol (e.g. TCP) to the airport moving map overlay 118, the application interface 120, and actuation manager 122, respectively.

The aircraft 102 may include the flight displays 106. The aircraft 102 may include any number of the flight displays 106, such as, but not limited to, one, two, three, or more flight displays. The flight displays 106 may include, but are not limited to, one or more head-down displays (HDDs), one or more head-up displays (HUDs), one or more multi-function displays (MFDs), or the like. The flight displays 106 may be implemented using any of a variety of display technologies, including CRT, LCD, organic LED, dot matrix display, and others. The flight displays 106 may be navigation (NAV) displays, primary flight displays, synthetic vision system displays, head up displays (HUDs) with or without a projector, and the like. The flight displays 106 may be used to provide information to the flight crew, thereby increasing visual range and enhancing decision-making abilities. One or more of the flight displays 106 may be configured to function as, for example, a primary flight display (PFD) used to display altitude, airspeed, vertical speed, and navigation and traffic collision avoidance system (TCAS) advisories. One or more of the flight displays 106 may also be configured to function as, for example, a multi-function display used to display navigation maps, weather radar, electronic charts, TCAS traffic, aircraft maintenance data and electronic checklists, manuals, and procedures. One or more of the flight displays 106 may also be configured to function as, for example, an engine indicating and crew-alerting system (EICAS) display used to display critical engine and system status data. Other types and functions of the flight displays 106 are contemplated as well. According to various exemplary embodiments of the inventive concepts disclosed herein, at least one of the flight displays 106 may be configured to provide a rendered display from the systems and methods of the present disclosure. The flight displays 106 may include an electronic display or a synthetic vision system (SVS). For example, the flight displays 106 may include a display configured to display a two-dimensional (2-D) image, a three-dimensional (3-D) perspective image of terrain and/or weather information, or a four-dimensional (4-D) display of weather information or forecast information. Other views of terrain and/or weather information may also be provided (e.g., plan view, horizontal view, vertical view). The views may include monochrome or color graphical representations of the terrain and/or weather information. Graphical representations of weather or terrain may include an indication of altitude of the weather or terrain or the altitude relative to an aircraft.

In some embodiments, the flight displays 106 may display an airport moving map. The flight displays 106 may be configured to display three-dimensional images (e.g., as part of a Synthetic Vision System, or SVS) and/or two-dimensional images (e.g., a top-down airport moving map, or AMM).

The flight displays 106 may receive the graphical information 124 from the processors 108. The flight displays 106 may overlay the graphical information 124 on an Airport Moving Map (AMM). The graphical information 124 may visually indicate the instructions on the Airport moving map (AMM). The graphical information 124 may visually indicate a demarcation of where and when to stop the aircraft 102. The graphical information 124 may enable integrating Baseline 2 ATS data communication standards with Airport Moving Maps (AMM). The graphical information 124 may include visual cues that may be language independent.

The graphical information 124 may include a virtual "follow me" vehicle. During surface movements, current aircraft position and virtual follow me vehicle (visual cue) may be displayed on the AMM. The aircraft 102 may be navigated by following the virtual "follow me" vehicle. Although the graphical information 124 is described as including the virtual "follow me" vehicle, this is not intended as a limitation of the present disclosure. The graphical information may include a visual Taxi plan on the Airport Moving Map. The visual taxi plan may include a visual path and instructions to stop and proceed on the Airport moving map based on Taxi phase (push back, Taxiing, clear to enter runway, and the like).

The airport moving map overlay 118 may receive the graphical information 124. For example, the airport moving map overlay 118 may receive a command (e.g. Pushback command) from the datalink message transformer apparatus 116 on a defined interface communication standard such as JavaScript Object Notation (JSON). The airport moving map overlay 118 may generate visual Taxi route path with symbols by corelating data points with Airport moving map database and aircraft position (e.g. latitude, longitude of intersection points, Taxi Lanes, and the like). The airport moving map overlay 118 may output to the flight displays a view of an airport moving map (AMM), the AMM depicting a location of the aircraft 102 on an airport surface with the graphical information 124 overlaid on the AMM. The airport moving map overlay 118 may use the AMM database 134 to overlay the graphical information 124 on the airport moving map.

The aircraft 102 may include the electronic flight bags 130. The electronic flight bags 130 may be tablets or tablet computers. The electronic flight bags 130 may be handheld devices. The electronic flight bags 130 may receive the application information 126. The electronic flight bags 130 may receive the application information 126 via the application interface 120. The application information 126 may be interfaced to the electronic flight bags 130 by the application interface 120. The application interface 120 may receive the application information 126 from the datalink message transformer apparatus 116. In embodiments, the application interface 120 is an application programming interface (API). The application information 126 may include application configuration settings for the electronic flight bags 130. For example, the application information 126 may include commands to pushback, clearance, Taxi plan, holding points, clearance Types, and the like. By way of another example, the application information 126 may include computed vectors, curves, and time constraint (Time preposition). The application interface 120 may interface the application information 126 to one or more third-party applications hosted by the electronic flight bags 130 through a secured gateway connection. The third-party applications may include a web browser application, such as, but not limited to, Airport Traffic Software as a Service.

The electronic flight bags 130 may display the application information 126. The electronic flight bags 130 may display the application information 126 to provide guidance graphically for navigation on Taxiways and ramp area. For example, the electronic flight bags 130 may provide guidance graphically for navigation on Taxiways and ramp area to Pilots within the aircraft 102. The electronic flight bags 130 may use the application information 126 to render agreed pushback plan, Taxi plan for the aircraft 102, and the like. For example, the application information 126 may display Graphical taxi path on third party map application using the APIs. Thus, the aircraft 102 may enable application-based guidance using the electronic flight bags 130 by automatically entering the Taxi path.

The aircraft 102 may include the actuators 132. The actuators 132 may include a traction device such a Taxi-bot to tug the Aircraft on ground. The taxi-bots may be used for traction of the aircraft 102 without powering the engines of the aircraft 102. The actuators 132 may also include a thrust, tiller, engine, or control surface of the aircraft 102. The actuation manager 122 may be configured to receive the actuation commands 128 and locomote the aircraft 102 based on the actuation commands 128. For example, the actuation manager 122 may cause the actuators 132 to locomote the aircraft 102 based on the actuation commands 128. The actuation commands 128 may be an actuation stimulus for locomotion of the aircraft 102. The actuation commands 128 may be defined according to one or more interface standards, such as, but not limited to, JSON. The actuation commands 128 may cause the actuators 132 to follow the actuation commands 128. For example, the actuation commands 128 may cause the actuators 132 to locomote the aircraft 102 up to a runway. By way of another example, the actuation commands 128 may cause the thrust/ control surface (e.g., Tiller) to locomote the aircraft 102 in ATC instructed trajectory to the Runway. Thus, the actuators 132 may be controlled automatically based on the actuation commands 128 generated from the CPDLC messages 105.

Figure 2:
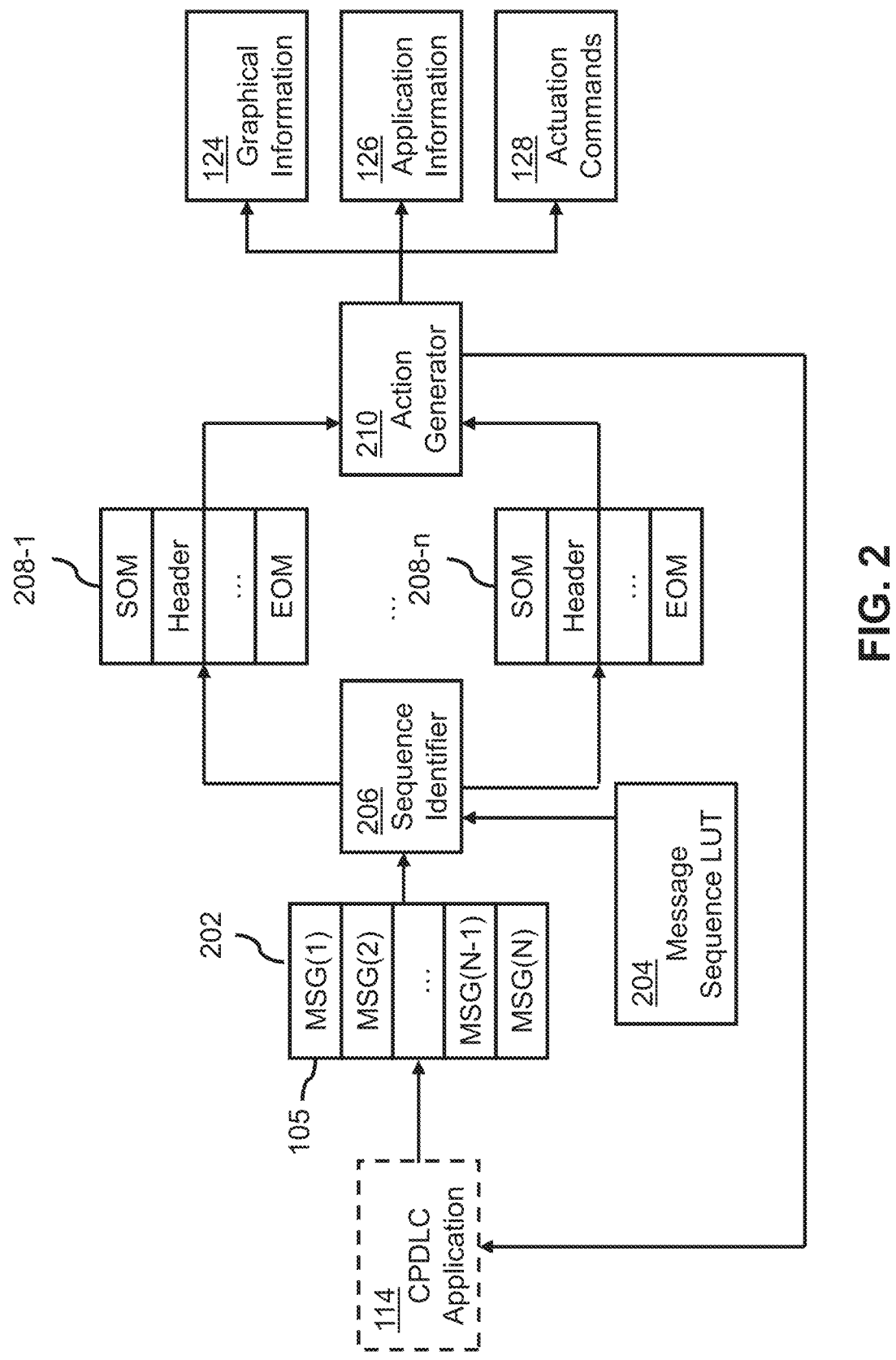
FIG. 2 depicts a block diagram of a datalink message transformer apparatus, in accordance with one or more embodiments of the present disclosure.

Referring now to FIG. 2, the datalink message transformer apparatus 116 is described, in accordance with one or more embodiments of the present disclosure. The datalink message transformer apparatus 116 may include one or more of a message queue 202, message sequence look-up table 204, sequence identifier 206, identified sequences 208, action generator 210, the graphical information 124, the application information 126, the actuation commands 128, and the like.

The datalink message transformer apparatus 116 may include the message queue 202. The datalink message transformer apparatus 116 may be configured to receive the CPDLC messages 105 from the CPDLC application 114 and store the CPDLC messages 105 in the message queue 202. The datalink message transformer apparatus 116 may monitor the uplink messages and downlink messages of the CPDLC messages 105 (e.g., DCL and D-Taxi) from the CPDLC application 114. As the communication (uplink and downlink) happens, the CPDLC messages 105 may be stored in the message queue 202.

The datalink message transformer apparatus 116 may include the message sequence look-up table 204. The message sequence look-up table 204 may include predefined sequences of the CPDLC messages 105 for surface operations. For example, the message sequence look-up table 204 may include predefined sequences of downlink messages and uplink messages between the aircraft 102 and the air traffic service unit 104. One example of the predefined sequences may include an aircraft pushback request and response sequence. The aircraft pushback request and response sequence may include a request pushback downlink message (DM131), a pushback approved uplink message (UM304), an expect pushback uplink message (UM270), and a will-comply response.

The datalink message transformer apparatus 116 may include the sequence identifier 206. The sequence identifier 206 may look-up the CPDLC messages 105 which are stored in the message queue 202 in the message sequence look-up table 204. The sequence identifier 206 may look-up the CPDLC messages 105 which are stored in the message queue 202 in the message sequence look-up table 204 to identify the identified sequences 208. The sequence identifier 206 may identify the beginning and end of the identified sequences 208 based on the start of transaction and an end of transaction, respectively, of the CPDLC (e.g., DCL and D-Taxi) messages in the message queue 202. The sequence identifier 206 may identify the identified sequences 208 when the CPDLC messages 105 from the message queue 202 match a predefined sequence in the message sequence look-up table 204. For example, the sequence identifier 206 may compare a sequence of pushback messages in the message queue 202 with a predefined surface operation defined in the message sequence look-up table 204. Once the sequence of messages matches with the predefined sequence for a particular surface operation, then the sequence identifier 206 may extract the data points needed for that surface operation and create the identified sequences 208 for the corresponding operation (e.g., Pushback). Thus, the sequence identifier 206 may look for the sequence of the CPDLC messages 105 (e.g., DCL and D-Taxi) in a particular order in the message queue 202 to identify aircraft surface operation (e.g., Pushback/Taxi). One or more of the CPDLC messages 105 may define the identified sequences 208. In this regard, the identified sequences 208 may include multiple of the CPDLC messages 105.

The datalink message transformer apparatus 116 may include the identified sequences 208. The datalink message transformer apparatus 116 may include any number of the identified sequence 208-1 to 208-$n$, where n is an integer. The number n of the identified sequences 208 may depend on a storage capacity of the memory 110. The identified sequences 208 may include parameters such as, but not limited to, start-of-message (SOM), headers, pushback directions, from location, to location, clearance type, end-of-message (EOM), aircraft Id, departure location, runway number, runway location, taxi time, taxi routes, holding points, intersection clearances, apron, ramp to perform the aircraft surface operations (e.g., Pushback/Taxi), and the like.

The datalink message transformer apparatus 116 may include the action generator 210. The action generator 210 may generate the graphical information 124, the application information 126, and/or the actuation commands 128 from the identified sequences 208. For example, the action generator 210 may extract surface operations (e.g. Pushback, Taxiway points (from and to locations), from location and to location named identifiers). Based on surface operation and using from and to location, the action generator 210 may compute intermediate Taxi points (between from and to locations) using airport routing tables to connect from and to location in the identified sequences 208. The action generator 210 may sort these parameters (from location, intermediate location, to location) to create a route path in terms of vectors and curves to connect from and to location with specified details like latitude, longitude, distance, Time preposition and arc radius. For example, the action generator 210 may extract Taxi point A (from location) and Taxi point B (to location) from the identified sequences 208.

In embodiments, the datalink message transformer apparatus 116 may provide feedback to the CPDLC application 114. The feedback may include a will-comply message (WILCO). For example, the actuation manager 122 may determine that the identified sequences 208 should end with the will-comply message and cause the CPDLC application 114 to generate the will-comply message and transmit the will-comply message from the communication system 112 to the air traffic service unit 104. Generating the will-comply message may enable auto-reply for Single Pilot Operation (SPO). The actuation manager 122 may use the checklist database 136 when causing the actuators 132 to actuate the aircraft 102.

Figure 3A:
FIG. 3A-3B depicts an action generator determining a path, in accordance with one or more embodiments of the present disclosure.
Figure 3B:
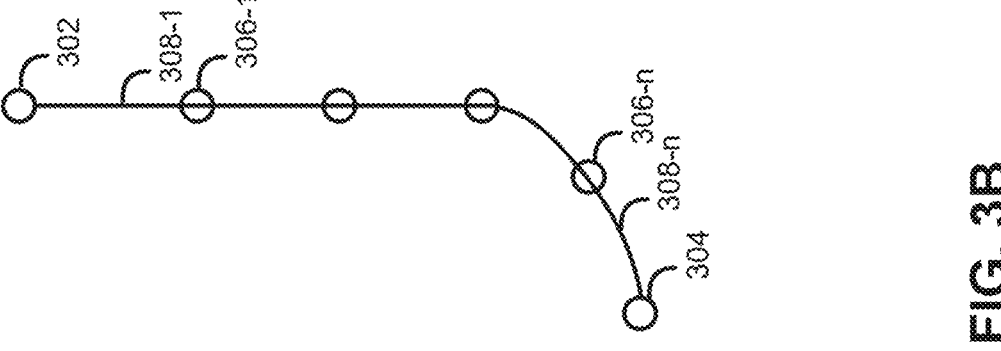
Figure 3C:
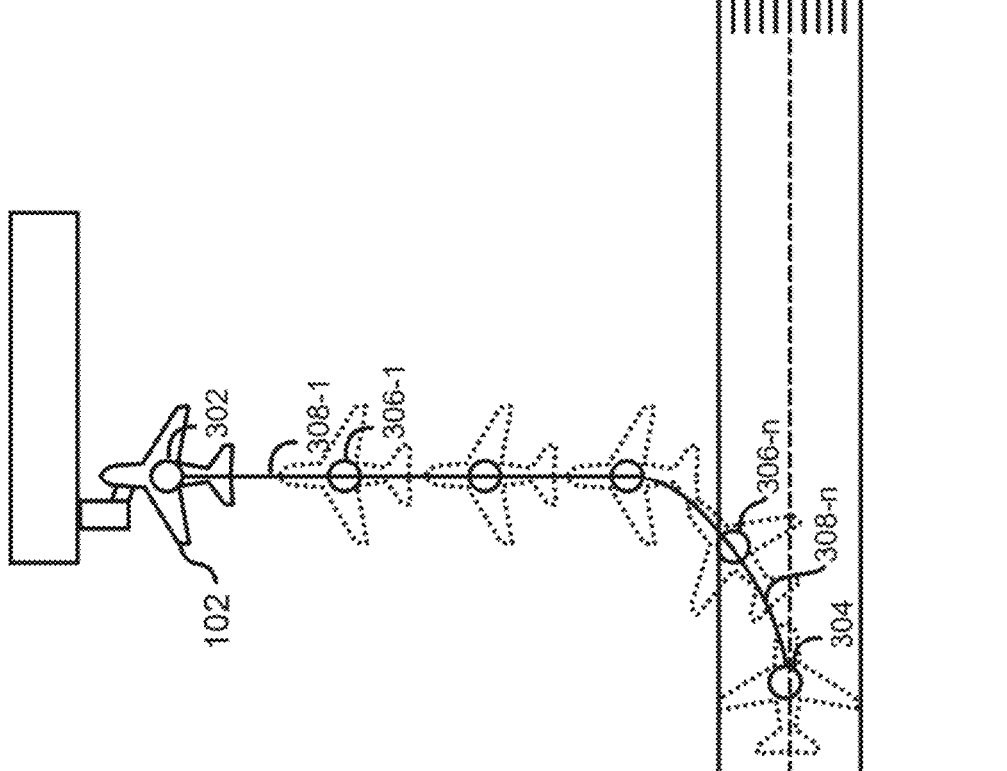
FIG. 3C depicts an airport moving map, in accordance with one or more embodiments of the present disclosure.

Referring now to FIGS. 3A-3C, the action generator 210 is described, in accordance with one or more embodiments of the present disclosure. The action generator 210 may determine a "from location" 302 and a "to location" 304. The action generator 210 may determine the "from location" 302 and the "to location" 304 from the identified sequences 208. The "from location" 302 and the "to location" 304 may include a gate and a taxiway, respectively, where the identified sequence is a pushback request and response sequence. The action generator 210 may determine vertices 306-1 through 306-$n$ (vertices 306) and vectors 308-1 through vectors 308-n (vectors 308). The vertices 306 and the vectors 308 may define a path between the "from location" 302 and the "to location" 304. The action generator 210 may determine the vertices 306 and the vectors 308 using an internal airport routing mapping table. The "from location" 302, "to location" 304, vertices 306, and vectors 308 may include latitudes, longitudes, distance, Time constraint (Time pre-position), and the like. The vectors 308 may connect in segments between the vertices 306. The vectors 308 may include straight vectors and/or curved vectors (e.g., arcs). The action generator 210 may determine any number of the vertices 306-1 through 306-$n$, where n is an integer. Similarly, the action generator 210 may determine any number of the vectors 308-1 through 308-$n$, where n is an integer.

The graphical information 124, the application information 126, and/or the actuation commands 128 may include the "from location" 302, "to location" 304, vertices 306, and vectors 308. For example, the airport moving map overlay 118 may receive the "from location" 302, "to location" 304, vertices 306, and vectors 308 from the datalink message transformer apparatus 116 as the graphical information 124. The airport moving map overlay 118 may use the "from location" 302, "to location" 304, vertices 306, and vectors 308 to output to the flight displays 106 a view of an AMM 310. For example, the AMM 310 may depict a location of the aircraft 102 on an airport surface with the graphical information 124 overlaid on the AMM. The AMM 310 may display the "from location" 302, "to location" 304, vertices 306, and vectors 308. The AMM 310 may include an own-ship position of the aircraft 102, based on the "from location" 302. The AMM 310 may also include one or more future own-ship positions of the aircraft 102 based on the vertices 306. The airport moving map overlay 118 may convert co-ordinates of the "from location" 302, "to location" 304, vertices 306, and vectors 308 into graphical co-ordinates (screen coordinates) for display on the flight displays 106.

FIG. 3C depicts an example of the AMM 310 depicting a pushback route starting at the "from location" 302 being overlaid with the gate and ending at the "to location" 304 being overlaid at a taxi-way. The airport moving map overlay 118 may generate the pushback route by connecting these graphical co-ordinates (screen coordinates) in line or curve format. The AMM 310 may indicate for the aircraft 102 to pushback from the gate, make a turn, and get onto the taxiway. In this example, the AMM 310 illustrates the push back operation to be executed by the aircraft 102. The push back operation may include pushing back the aircraft 102 from the gate to the taxiway.

Figure 4:
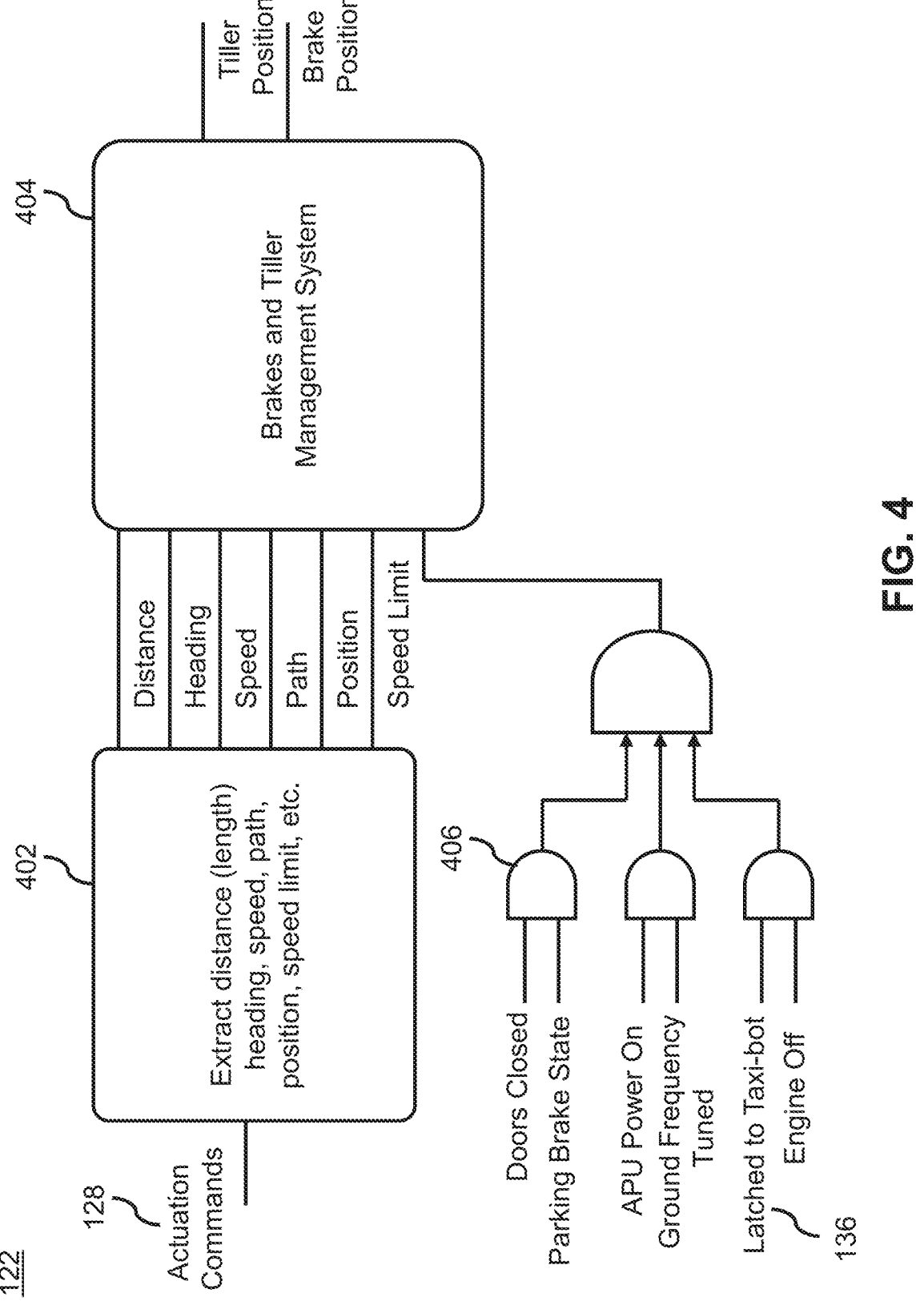
FIG. 4 depicts an actuation manager, in accordance with one or more embodiments of the present disclosure.

FIG. 4 depicts the actuation manager 122, in accordance with one or more embodiments of the present disclosure. The actuation manager 122 may receive the actuation commands 128. For example, the actuation manager 122 may receive the actuation commands 128 from the datalink message transformer apparatus 116. The actuation manager 122 may extract 402 a distance, heading, speed, path, position, speed limit, and the like from the actuation commands 128. The distance, heading, speed, path, position, speed limit, and the like may be provided to a brakes and tiller management system 404. The position may include a current aircraft position determined from ADS-B or the like. The speed limit may include a max taxi phase speed limit. The brakes and tiller management system 404 may control a tiller position and/or a brake position based on the distance, heading, speed, path, position, speed limit, and the like.

The actuation manager 122 may also handle the checklist database 136. For example, the checklist database 136 may include a checklist including, but not limited to, doors closed, a parking brake state, an auxiliary power unit (APU) power on, a ground frequency tuned, a latched to taxi-bot, and an engine off. The actuation manager 122 may include one or more logic gates 406 to handle the checklist database 136. The logic gates 406 may include AND gates. The actuation manager 122 may not control the tiller position and/or the brake position until each of the requirements in the checklist database 136 is satisfied. For example, once the actuation manager 122 receives the actuation commands 128, then the actuation manager 122 may check whether the requirements in the checklist database 136 are completed. Once the requirements in the checklist database 136 are completed, then the actuation manager 122 may compute the tiller position and/or brake position. The actuation manager 122 may also command the tiller to the tiller position and/or the brakes to the brake position. The aircraft 102 may then push back according to the actuation commands 128. The tiller position may be computed based on the wheel base of the aircraft 102 divided by the turning radius of the aircraft 102.

Referring generally again to the figures.

The datalink message transformer apparatus 116 may enable efficient ground movement especially abridging the Human-Machine-Human transactions. The datalink message transformer apparatus 116 may enable expedited movement of the aircraft 102 on the ground when taxiing. The datalink message transformer apparatus 116 may reduce Pilot deviations and avoids runway incursions. The datalink message transformer apparatus 116 may reduce Pilot workload due to visual guidance on Cockpit displays, Handheld devices, or takeover by Taxi-bots. The datalink message transformer apparatus 116 may be a precursor for Datalink user interface for Single pilot operations on ground.

Overlaying the graphical information 124 on the airport moving map may provide visual cues to guide the pilot on ground. The graphical information 124 may provide the visual cues to guide the Pilot to runway for takeoff or from runway to gates after landing. For example, the Pilot may refer to AMM 310 to get current location and navigate along the graphical information 124. The graphical information

124 may provide Human-Machine Interface cues for the Pilot to further operate the aircraft 102. The visual cues may be provided to Pilot to navigate on Taxi way during the departure and arrival which reduces Pilot workload. The visual cues may create more situational awareness in a deterministic manner for Pilots to perform taxi procedures.

In embodiments, the processors 108 and memory 110 may be housed within a Common Computing Module (CCM) card. The datalink message transformer apparatus 116 may be executed by the Common Computing Module (CCM) card.

The datalink message transformer apparatus 116 and/or the CPDLC application 114 may run on distributed computing platforms and/or the same computing platforms. In embodiments, the datalink message transformer apparatus 116 may be a standalone software application and/or a software-as-a-service (SaaS). For example, the datalink message transformer apparatus 116 may be provided as a SaaS on cockpit browser window.

The methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented. It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

A processor may include any processing unit known in the art. For example, the processor may include a multi-core processor, a single-core processor, a reconfigurable logic device (e.g., FPGAs), a digital signal processor (DSP), a special purpose logic device (e.g., ASICs), or other integrated formats. Those skilled in the art will recognize that aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure. Such hardware, software, and/or firmware implementation may be a design choice based on various cost, efficiency, or other metrics. In this sense, the processor(s) may include any microprocessor-type device configured to execute software algorithms and/or instructions. In general, the term "processor" may be broadly defined to encompass any device having one or more processing elements, which execute program instructions from memory, from firmware, or by hardware implemented functions. It should be recognized that the steps described throughout the present disclosure may be carried out by the processors.

A memory may include any storage medium known in the art. For example, the storage medium may include a non-transitory memory medium. For instance, the non-transitory memory medium may include, but is not limited to, a read-only memory (ROM), a random-access memory (RAM), a magnetic or optical memory device (e.g., disk), a solid-state drive and the like. It is further noted that memory may be housed in a common controller housing with the one or more processor(s). For example, the memory and the processor may be housed in a processing unit, a desktop computer, or the like. In an alternative embodiment, the memory may be located remotely with respect to the physical location of the processor. In another embodiment, the memory maintains program instructions for causing the processor(s) to carry out the various steps described through the present disclosure.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mixable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. An aircraft comprising:
   a communication system configured to transmit and receive a plurality of CPDLC messages; wherein the communication system is configured to execute a CPDLC application;
   an actuator:
   a memory maintaining program instructions; and
   one or more processors configured to execute the program instructions causing the one or more processors to execute:
      a datalink message transformer apparatus; wherein the datalink message transformer apparatus comprises a message queue, a message sequence look-up table, a sequence identifier, an identified sequence, and an action generator; wherein the datalink message transformer apparatus is configured to receive the plurality of CPDLC messages from the CPDLC application and store the plurality of CPDLC messages in the message queue; wherein the sequence identifier is configured to look-up the plurality of CPDLC messages which are stored in the message queue in the message sequence look-up table to identify the identified sequence;
      wherein the action generator is configured to generate at least-one of a graphical information and an actuation command from the identified sequence; and
      an actuation manager; wherein the actuation manager is configured to cause the actuator to locomote the aircraft based on the actuation command.

2. The aircraft of claim 1, wherein the plurality of CPDLC messages comprise at least one of a plurality of CPDLC departure clearance messages or a plurality of Data Link Taxi messages.

3. The aircraft of claim 2, wherein the sequence identifier is configured to identify a beginning and an end of the identified sequence based on a start of transaction and an end of transaction of the plurality of CPDLC messages.

4. The aircraft of claim 1, wherein the CPDLC application is configured to decode the plurality of CPDLC messages.

5. The aircraft of claim 4, wherein the CPDLC application is configured to decode the plurality of CPDLC messages from an ASN.1 format.

6. The aircraft of claim 1, wherein the CPDLC application is configured to communicate the plurality of CPDLC messages to the datalink message transformer apparatus using one or more inter-process communication methods.

7. The aircraft of claim 1, wherein the sequence identifier is configured to identify the identified sequence by matching the plurality of CPDLC messages with a predefined sequence in the message sequence look-up table.

8. The aircraft of claim 7, wherein the predefined sequence comprises a pushback request and response sequence.

9. The aircraft of claim 8, wherein the pushback request and response sequence comprises a request pushback downlink message, a pushback approved uplink message, an expect pushback uplink message, and a will-comply response.

10. The aircraft of claim 1, comprising a flight display, wherein the flight display is configured to display an airport moving map; the program instructions causing the one or more processors to execute an airport moving map overlay; wherein the airport moving map overlay is configured to cause the flight display to overlay the graphical information on the airport moving map.

11. The aircraft of claim 1, comprising an electronic flight bag; the program instructions causing the one or more processors to execute an application interface; wherein the action generator is configured to generate an application information from the identified sequence; wherein the electronic flight bag is configured to receive the application information via the application interface and display the application information.

12. The aircraft of claim 11, wherein the application interface is an application programming interface.

13. The aircraft of claim 1, wherein the action generator is configured to determine a "from location" and a "to location" from the identified sequence; wherein the action generator is configured to determine a plurality of vertices and a plurality of vectors between the "from location" and the "to location"; wherein at least one of the graphical information or the actuation command comprises the "from location", the "to location", the plurality of vertices, and the plurality of vectors.

14. The aircraft of claim 1, wherein the actuation manager is configured to cause the CPDLC application to generate a will-comply message and transmit the will-comply message from the communication system in response to determining that the identified sequence should end with the will-comply message.

15. The aircraft of claim 1, wherein the actuation manager comprises a brakes and tiller management system, wherein the brakes and tiller management system is configured to control a brake and a tiller of the aircraft.

16. The aircraft of claim 15, wherein the actuation manager comprises a checklist database, wherein the actuation manager does not control a position of the tiller until each requirement in the checklist database is completed.

17. A system comprising:
   an aircraft comprising:
      a communication system configured to transmit and receive a plurality of CPDLC messages; wherein the communication system is configured to execute a CPDLC application;
      an actuator;
      a memory maintaining program instructions; and
      one or more processors configured to execute the program instructions causing the one or more processors to execute:
         a datalink message transformer apparatus; wherein the datalink message transformer apparatus comprises a message queue, a message sequence look-up table, a sequence identifier, an identified sequence, and an action generator; wherein the datalink message transformer apparatus is configured to receive the plurality of CPDLC messages from the CPDLC application and store the plurality of CPDLC messages in the message queue; wherein the sequence identifier is configured to look-up the plurality of CPDLC messages which are stored in the message queue in the message sequence look-up table to identify the identified sequence; wherein the action generator is configured to generate at least a graphical information and an actuation command from the identified sequence; and
         an actuation manager; wherein the actuation manager is configured to cause the actuator to locomote the aircraft based on the actuation command; and an air traffic service unit; wherein the communication system is configured to transmit and receive the plurality of CPDLC messages with the air traffic service unit.

18. The aircraft of claim 13, wherein the "from location" and the "to location" comprise respective of a gate and a taxiway; wherein the identified sequence is a pushback request and response sequence.

19. The aircraft of claim 13, wherein the action generator is configured to determine the plurality of vertices and the plurality of vectors using an internal airport routing mapping table.

\* \* \* \* \*